US008176924B2

(12) United States Patent
Schneider et al.

(10) Patent No.: US 8,176,924 B2
(45) Date of Patent: May 15, 2012

(54) COLOR CHANGING ARTIFICIAL FINGERNAILS

(75) Inventors: Tod Schneider, Kent, OH (US); Debra Chaney, Hartville, OH (US)

(73) Assignee: Kent Displays Incorporated, Kent, OH (US)

( * ) Notice: Subject to any disclaimer, the term of this patent is extended or adjusted under 35 U.S.C. 154(b) by 254 days.

(21) Appl. No.: 12/722,176

(22) Filed: Mar. 11, 2010

(65) Prior Publication Data

US 2011/0061670 A1    Mar. 17, 2011

Related U.S. Application Data (60) Provisional application No. 61/159,267, filed on Mar. 11, 2009.

(51) Int. Cl.
| | |
|---|---|
| A45D 29/00 | (2006.01) |
| A45D 24/00 | (2006.01) |
| A45D 7/00 | (2006.01) |
| G02F 1/1335 | (2006.01) |
| C09K 19/02 | (2006.01) |
| G09G 3/36 | (2006.01) |

(52) U.S. Cl. ............. 132/73; 349/115; 349/175; 345/87
(58) Field of Classification Search ...................... 132/73, 132/200, 73.5, 73.6, 75.3, 75.8, 76.5, 285, 132/319, 333; 424/401, 61, 63; 428/29, 428/1.1, 1.2; 40/448, 542, 544, 900; 472/72, 472/70, 71; 349/115, 175; 63/42; 345/87–104, 345/107; 359/243, 296
See application file for complete search history.

(56) References Cited

U.S. PATENT DOCUMENTS

| | | | |
|---|---|---|---|
| 2,816,555 A | 12/1957 | Klump | |
| 4,070,912 A * | 1/1978 | McNaughtan et al. | ........ 374/162 |
| 4,920,991 A | 5/1990 | Shibahashi et al. | |
| 5,347,811 A | 9/1994 | Hasegawa et al. | |
| 5,453,863 A | 9/1995 | West et al. | |
| 5,644,330 A | 7/1997 | Catchpole et al. | |
| 5,691,795 A | 11/1997 | Doane et al. | |
| 5,748,277 A | 5/1998 | Huang et al. | |
| 6,035,860 A * | 3/2000 | Mombourquette | ........... 132/200 |
| 6,133,895 A | 10/2000 | Huang | |
| 6,154,190 A | 11/2000 | Yang et al. | |
| 6,177,093 B1 * | 1/2001 | Lombardi et al. | ............ 424/401 |
| 6,286,517 B1 * | 9/2001 | Weber et al. | ..................... 132/73 |
| 6,377,321 B1 | 4/2002 | Khan et al. | |
| 6,394,595 B1 * | 5/2002 | Jiang et al. | ..................... 347/101 |
| 6,410,130 B1 * | 6/2002 | Schuhmacher et al. | ...... 428/327 |
| 6,414,092 B1 * | 7/2002 | Coates et al. | ................... 526/63 |

(Continued)

OTHER PUBLICATIONS

E. Montbach et al., "Flexible Electronic Skin Display", SID Intl. Symp. Digest Tech., 40 16 (2009).

(Continued)

*Primary Examiner* — Todd Manahan
*Assistant Examiner* — Vanitha Elgart
(74) *Attorney, Agent, or Firm* — Pearne & Gordon LLP (57) ABSTRACT

Electronic color changing artificial nails comprise a polymer layer in a general shape of a human natural nail, bistable electro-optic material and a ledge on which display electrodes are disposed located at a tip of the artificial nail. Once the artificial nail is attached to the natural nail, the artificial nail can be updated by simply plugging the tip into a separate electronic color changing device which is used to set the color of the nail to whatever the user desires.

31 Claims, 6 Drawing Sheets

U.S. PATENT DOCUMENTS

| | | | |
|---|---|---|---|
| 6,515,717 B1 * | 2/2003 | Jiang et al. ........................ 349/2 |
| 6,654,080 B1 | 11/2003 | Khan et al. |
| 6,730,154 B2 * | 5/2004 | Inoue et al. ................. 106/31.68 |
| 6,934,792 B1 | 8/2005 | Nakazawa |
| 7,061,559 B2 | 6/2006 | Khan et al. |
| 7,122,227 B2 * | 10/2006 | Vaughn-Spickers et al. .. 428/1.1 |
| 7,170,481 B2 | 1/2007 | Doane et al. |
| 7,190,337 B2 | 3/2007 | Miller, IV et al. |
| 7,236,151 B2 | 6/2007 | Doane et al. |
| 7,351,506 B2 | 4/2008 | Schneider et al. |
| 7,744,776 B2 * | 6/2010 | Tanabe ....................... 252/299.7 |
| 7,771,801 B2 * | 8/2010 | Farrand ........................ 428/1.1 |
| 7,998,540 B2 * | 8/2011 | Goulding et al. .............. 428/1.1 |
| 8,007,583 B2 * | 8/2011 | Fuller et al. ................... 106/446 |
| 8,048,336 B2 * | 11/2011 | Tanabe ....................... 252/299.7 |
| 2003/0012753 A1 * | 1/2003 | Simon ............................. 424/63 |
| 2003/0017124 A1 * | 1/2003 | Agostini et al. ................ 424/63 |
| 2003/0160210 A1 * | 8/2003 | Bremer et al. ............ 252/299.01 |
| 2003/0178601 A1 * | 9/2003 | Kirsch et al. .............. 252/299.62 |
| 2004/0202623 A1 * | 10/2004 | Quadir ............................ 424/59 |
| 2004/0258894 A1 * | 12/2004 | Jiang et al. .................... 428/212 |
| 2007/0139299 A1 | 6/2007 | Huang et al. |
| 2007/0181142 A1 * | 8/2007 | Tufts et al. ...................... 132/73 |
| 2007/0277659 A1 | 12/2007 | Schneider et al. |
| 2007/0295349 A1 * | 12/2007 | Simpson ......................... 132/73 |
| 2008/0081022 A1 * | 4/2008 | Yu et al. .......................... 424/43 |
| 2008/0092778 A1 * | 4/2008 | Bauer et al. ................... 106/419 |
| 2008/0143943 A1 * | 6/2008 | May et al. ..................... 349/117 |
| 2008/0175806 A1 * | 7/2008 | Tanabe ........................... 424/64 |
| 2009/0126316 A1 * | 5/2009 | Ilekti et al. .................. 53/111 R |
| 2009/0284691 A1 | 11/2009 | Marhefka et al. |
| 2010/0040844 A1 * | 2/2010 | Larson .......................... 428/203 |
| 2010/0178508 A1 * | 7/2010 | Kasch et al. .................. 428/402 |
| 2010/0212681 A1 * | 8/2010 | Park .............................. 132/200 |
| 2010/0219374 A1 * | 9/2010 | Tanabe ....................... 252/299.7 |

OTHER PUBLICATIONS

"Cholesteric Liquid Crystals for Flexible Displays", in Flexible Flat Panel Displays, Ed. G. Crawford, (John Wiley & Sons, 2005) J.W. Doane and A. Khan, Chapter 17.

* cited by examiner

COLOR CHANGING ARTIFICIAL FINGERNAILS

CROSS-REFERENCE TO RELATED APPLICATION

This application claims the benefit of U.S. Provisional Patent Application Ser. No. 61/159,267 filed on Mar. 11, 2009, the contents of which are incorporated herein by reference in their entirety.

FIELD OF THE INVENTION

The invention relates to bistable electro-optic devices that are mounted on fingernails that can be switched using external electronics to reflect any color selected by the user.

BACKGROUND OF THE INVENTION

Artificial nail enhancements were first conceived in the mid 1950's as decorative shields for the finger nail (U.S. Pat. No. 2,816,555). They have since become commonplace in the consumer retail environment and are readily available in various forms from professional nail salons. Indeed, there are a number of variations to color the artificial nail enhancements from paint/pigments to metallic foils to thermochromic cholesteric liquid crystals (U.S. Pat. No. 4,920,991). This disclosure pertains to the use of bistable reflective electro-optic materials, such as bistable cholesteric liquid crystal materials, to form color changing artificial nails.

There are many reflective display technologies. However, many of them are not attractive for a color changing artificial nail application because of the many requirements: high reflectivity, wide color gamut, low cost, mechanical robustness, and thin conformable geometries in addition to low-power detached electronics. An old and well known bistable technology is the electrochromic display technology. This technology, however, has insufficient color gamut and, even though bistable, is not a low power option in that it is current driven requiring significant power from the battery to change the color. The bistable electrophoretic technology is used in black and white displays and covers but it is not yet developed for color. Further, it is not attractive for conformable color changing nail development as it would require high resolution patterning of the primary colors which adds considerably to the cost and limits the brightness to less than 33%. Electromechanical displays also suffer from this 33% reflectance limitation. Electrowetting lenses (U.S. Pat. No. 6,934,792) have been proposed; however, this scheme results in low reflectivity, the inability to mix colors, and suffers from objectionable layer thickness. Polarizer-based LCD technologies (e.g., Zenthal Displays, bistable STN) have been made bistable for reduced power but these use color filters to achieve color and as such can suffer from not being reflective enough for color changing artificial nail applications.

A potential reflective technology that might be considered for color changing artificial fingernails is the electrowetting or electrofluidic display technology. One major limitation of this technology for artificial color changing nails is that power must be applied continuously to display a particular color, hence; one cannot decouple the electronics which is a required due to space limitations. At this time the bistable cholesteric liquid crystal technology is the preferred technology and the one most sufficiently advanced for color changing artificial nail applications.

Cholesteric liquid crystalline (ChLC) materials are unique in their optical and electro-optic features. They are bistable (see U.S. Pat. Nos. 5,347,811 and 5,453,863, which are incorporated by reference) so that no power is required to maintain a selected color for the artificial nail. These materials possess a helical structure in which the liquid crystal (LC) director twists around a helical axis. The reflected light is circularly polarized with the same handedness as the helical structure of the LC. They can be tailored to Bragg reflect light at a preselected wavelength and bandwidth by controlling the pitch of the helical twist through the concentration of chiral dopants and the birefringence of the nematic host, respectively. If the incident light is not polarized, it will be decomposed into two circular polarized components with opposite handedness and one of the components reflected.

The cholesteric material is typically electrically switched to either one of two stable textures: planar or focal conic as described, for example, in the U.S. Pat. No. 5,453,863. One can electronically switch between the two states with a voltage pulse of different magnitude. In the planar texture, the director of the LC (direction of the long axis of the molecule) is uniformly parallel to the plane of the substrates across the cell but has a helical twist perpendicular to the plane of the substrates. It is the helical twist of the uniform planar texture that Bragg reflects light in a selected wavelength band. The focal conic texture contains defects that perturb the orientation of the liquid crystalline helices. In the typical focal conic texture, the defect density is high; thus the helical domain size becomes small and randomized in orientation such that it is just weakly scattering and does not reflect impinging light (i.e., it is essentially transparent to incident light). Once the defect structures are created, they are topologically stable and cannot be removed unless by some external force such as an electric field or melting the material out of the liquid crystalline phase to the isotropic phase. Thus, the focal conic texture remains stable and forward scatters light of all wavelengths into an absorbing (usually black) background. To achieve full color displays, individual layers of red, green, and blue reflecting cholesteric liquid crystal can be stacked on top of one another (e.g., U.S. Pat. Nos. 6,654,080 and 6,377,321). The intensity of the reflected colored light can be adjusted by the voltage pulse so that a vertical stack of the three primary colors, red, green and blue can be mixed to show any color; 4096 colors have been demonstrated.

SUMMARY OF THE INVENTION

The invention relates to bistable electro-optic devices that are mounted on fingernails that can be switched using external electronics to reflect any color selected by the user. For example, color changing electronic skins including reflective cholesteric liquid crystals are adhered to an artificial fingernail containing ledge electronic interconnects at the ledge underneath the tip of the nail. Once the nail is attached to the natural nail bed of the finger using a pressure sensitive adhesive (PSA), a gel-bond pressure set resin, and/or a thermosetting resin, the nail can be updated by simply plugging the tip into a separate electronic color changing device which is used to set the color of the nail to whatever color the user desires.

The electronic color changing nails need to be protected from the environment (e.g., complete encapsulation to prevent penetration of hot/cold water during hand washing) as well as impact. The color changing nails may be formed by: laminating the electronic skin to a clear acrylic artificial nail carrier which is then attached to the natural nail using a PSA and/or gel-bond pressure set resin; injection molding the electronic skin such that it is embedded in, for example, polystyrene or polyurethane that has been shaped to the natural nail (with exposed ledge interconnect under the tip) which is then attached to the natural nail using a PSA and/or gel-bond pressure set resin; having a professional manicurist sculpt the electronic skin to the natural nail with the electronic interconnect pre-attached by placing a pre-cut electronic skin over the natural nail with an attached form and brushing a quick setting (e.g., 3 minute setting) ethyl or methyl methacrylate/ polymer resin to build a hard encapsulating overcoat to protect the artificial nail. Once the artificial nail has been set and cured on the finger, one selects the chosen update color on the separate electronic color changing device and then plugs the tip of the artificial nail containing the electronic interconnects into a receptacle on the device. Interconnects that are under the nail contact electrodes in the receptacle within the box and the artificial nail is then updated electronically to the selected color by applying suitable voltages to the ledge interconnects. The ledge interconnects under the artificial nail can be hidden by an opaque strip at the tip of the artificial nail that is commonly referred to as a "French Tip" in the industry.

The display used in the artificial nails of this disclosure is ideally an electronic skin such as disclosed in U.S. patent application Ser. No. 12/152,862, which is incorporated herein by reference in its entirety, and can be electrically driven to produce different colors with uniform reflectivity as disclosed in that application. The electronic skin can also have the features described in proceedings publication "Flexible Electronic Skin Display", *SID Intl. Symp. Digest Tech.*, 40 16 (2009) by E. Montbach et al. that uses a polymerization induced phase separation encapsulated cholesteric liquid crystal as described in the U.S. Pat. No. 7,351,506, which is incorporated by reference in its entirety. Other multilayer stacked cholesteric liquid crystal designs which may be adapted for electronic skins are described in U.S. Pat. Nos. 7,170,481 entitled Single Substrate Liquid Crystal Display, and 7,236,151 entitled Liquid Crystal Display, which are incorporated herein by reference in their entireties. The substrate need not be rigid but can be flexible or drapable as disclosed in the U.S. Pat. No. 7,236,151. The electronic skin that can be used in this disclosure is flexible, thin and can be cut into any desired shape such as a shape conforming to a shape of a fingernail or portion of a fingernail such as the tip. The electronic skin can be laser cut in the desired shape as disclosed in U.S. patent application Ser. No. 11/756,987, which is incorporated herein by reference in its entirety. The electronic skin includes the stacked layers that make up the display including stacked dispersion layers of cholesteric liquid crystal material dispersed in a polymer matrix, electrodes flanking each dispersion layer, proximal and distal substrates (relative to the viewer/user) and substrates between dispersion layers (or a single substrate on which the display is formed with an outer protective polymer layer to strengthen and ruggedize the display) and optionally a light absorbing layer. The electronic skin can be preformed and precut into a variety of shapes and sizes so as to form a set of electronic skins that can be used to fit the nails of any person receiving artificial nails despite the different sizes of various natural nails. Anywhere this disclosure mentions use of a display, the specific use of the electronic skin is contemplated.

Electronic skin can encompass components of a bistable cholesteric display cell made of stacked layers to create a multitude of colors as described for example in U.S. Pat. Nos. 6,654,080, 6,377,321 and 7,061,559, which are incorporated herein by reference in their entireties. These patents describe cholesteric displays that can create a full color image that remains on the display without applied power until erased and addressed with a new image. The stacked liquid crystal layers of the electronic skin are in the form of a film or sheet. The entire surface of the display can change from one color to another. The colors of each layer in the electronic skin may be tuned to create a color space of particular interest such as; pink, violet, skin tones on colors matching garments. The color of the layers making up the entire electronic skin may be red, green, and blue or different colors. The electronic skin may be include a triple, double or even single liquid crystal layer if fewer colors are desired (e.g., a single active layer with a color back layer). The electronic skin can be made of flexible substrates such as plastic so that the skin can conform to the surface of the natural nail. Flexible cholesteric displays are briefly described in the book "Cholesteric Liquid Crystals for Flexible Displays" in *Flexible Flat Panel Displays*, Ed. G. Crawford, (John Wiley & Sons, 2005) J. W. Doane and A. Khan, Chapter 17, which is incorporated herein by reference in its entirety. The electronic skin is a form of display but may only provide a color without necessarily an image; however, producing images on the display is also contemplated as when patterned electrodes are used making a passive matrix display. The electronic skin may be thermoformed to conform to the desired shape and may possess unpatterned electrodes.

There are many different ways in which the display and polymer layer can be used to form the artificial nails. In general, first in a "surface prep" or preparation stage the surface of the natural nail bed is prepared in a known manner (such as by cleaning, roughening and anti-microbial treatment of the nail) and primer is optionally applied to the nail. An adhesive or resin layer is applied to bond the display to the nail. This can be a pressure sensitive such as Gel Bond™ by CND or thermosetting resin that is applied to the bottom of the display or to the natural nail. The display is adhered to the natural nail upon application of pressure or heat. The polymer layer of the adhesive or resin forms part of the artificial nail.

In using preformed artificial nails (including artificial nail tips or portions of an artificial nail that do not extend along an entire length of the nail but only in a region of the nail tip), the display might first be adhered to the natural nail or it might first be adhered to the preformed artificial nail. If the display is first adhered on the natural nail, a layer of polymer or adhesive is placed on top of the display and then the preformed artificial nail is adhered over the display. The display may be held in place such that the ledge and its electrical interconnects (e.g., ledge conductors, crimps, clamps or clips, conductive paint and metal interconnect tabs) overhang the nail using a form. The preformed artificial nail then provides a rigid frame for holding the tip end of the display in position. On the other hand, the artificial nail can have a layer of polymer adhesive applied to the underside and then the top of the display is adhered to the bottom of the artificial nail. The joined display and artificial nail can then be adhered to the natural nail using pressure sensitive or thermoset resin on an underside of the display.

When forming the polymer layer by coating, the display is adhered to the top of the natural nail using pressure sensitive or thermosetting adhesive on the natural nail bed or on the underside of the display. The adhesive may be spaced from the cuticle. The display may be maintained in proper position using a form that has a surface located beneath a free end of the natural nail to allow the display to extend beyond the free end of the natural nail to form an artificial tip. On the other hand, the display might only extend onto the upper surface of the natural nail and not beyond it. Then, the polymer layer is applied on the electronic skin by coating or painting the polymer layer. The polymer layer can contact the natural nail near the cuticle so as to embed the electronic skin within it so as to provide an environmental barrier. The polymer layer covers the display and may extend onto the form so as to form an artificial nail having a length longer than that of the natural nail. The polymer of the artificial nail may be a quick curing polymer or it might be a polymer that is cured upon application of light (e.g., a UV curable polymer). Components might be applied onto the clear polymer layer above the display to provide the artificial nails with strength such as a thin layer of woven fiberglass or silk material. The clear polymer layer would be disposed above and below the fiberglass material over the display.

One embodiment of this disclosure features artificial color changing nails comprising a layer of polymer in a general size and shape of a human natural nail. The polymer layer includes a body that can be placed in a fixed position above the natural nail and a tip near a free end of the natural nail. Typically, the tip will extend beyond the free end of the natural nail. A display can be stacked in a fixed position on the natural nail relative to the polymer layer comprising at least one electro-optic layer of bistable electro-optic material, and electrically conductive layers disposed on either side of the electro-optic layer. A ledge extends from the display that is disposed at the tip. The ledge can be formed of portions of each of the substrates of the display extending beyond the active area of the display, on which the display electrodes are disposed. Portions of the substrates and electro-optical material are removed so as to form staggered ledges of substrate and display electrode referred to herein collectively (and shown for ease of illustration in the drawings) as a single ledge of the display. Each of the conductive layers is spaced from and separated from another of the layers on the ledge. Spacers (e.g., glass or polymer spheres) separate adjacent display conductors from each other. For a three color display with unpatterned electrodes in the electro-optically active area of the display there can be 6 display electrodes, or this can be reduced to 4 shared electrodes with sequential driving such as disclosed in U.S. patent application Ser. No. 10/587,632. The electro-optic layer, being bistable, is able to stably display different colors or images in an absence of an electric field once the display has been updated by voltages applied to the electrically conductive layers through the display electrode interconnects. Ledge conductors may be disposed over the electrically conductive layers or display electrodes (e.g., conductive carbon) to coat and protect the display electrodes. This in turn may be coated over with silver paint or conductive carbon. Although the text sometimes refers to the ledge conductor as the conductor coating the display electrodes (e.g., conductive carbon), it will be appreciated that this conductive coating such as of conductive carbon, as well as the conductive silver paint, can both be considered to be ledge conductors).

Referring to specific features of the first embodiment, the electrical ledge conductors can be disposed on the ledge in electrical contact with the electrically conductive layers. The display can include a layer of light absorbing material disposed downstream of the electro-optic layer relative to a direction of light incident on the display (distal from the viewer's perspective). The polymer layer can be comprised of a preformed artificial nail or the polymer layer can be comprised of polymer that is coated over the display in one or more layers (e.g., acrylic polymer). An end of the body of the polymer layer opposite to the tip can be located in close proximity to a cuticle of the nail or spaced from a cuticle of the nail. A layer of pressure sensitive or thermosetting resin can be disposed beneath the display in contact with a surface of the nail. A layer of adhesive can be disposed between the display and the polymer layer (e.g., when the electronic skin is adhered to a preformed artificial nail such as Prescription Nails™ type of artificial nails). The polymer layer can be formed by injection molding and encapsulates the display (such as reaction injection molding with polyurethane). A pressure sensitive adhesive or thermosetting adhesive can be disposed between the display and the natural nail.

The electro-optic material can comprise bistable liquid crystal material and, in particular, bistable cholesteric liquid crystal material. The bistable cholesteric liquid crystal can comprise regions of liquid crystal material dispersed in a polymer matrix, such as the PIPS (U.S. Pat. No. 7,351,506), SIPS, TIPS or emulsions disclosed in U.S. Pat. Nos. 7,236, 151 and 7,170,481. The at least one electro-optic layer can comprise at least two layers of bistable cholesteric liquid crystal material each having a pitch length effective to reflect light of different color than the other liquid crystal layer. The liquid crystal layers can reflect any colors, including red, green and blue light.

In a specific aspect of this device, the display comprises flexible electronic skin. In one design, the electronic skin is folded over itself at the tip. The device includes a preformed artificial tip adhered in abutment with or overlapping the natural nail. The electronic skin is folded around an end of the artificial tip. Electrical ledge conductors are disposed on the ledge in electrical contact with the electrically conductive layers or the display electrodes, the ledge conductors being exposed at an underside of the artificial tip. If no artificial tip is used, the electronic skin may be folded around an end of a tip of a natural nail, if the natural nail has grown out enough to provide an underside sufficiently long to which the electronic skin can be adhered.

Another aspect employing vias, features a preformed artificial tip adhered in abutment with or overlapping the natural nail. Electrical ledge conductors are disposed on the ledge in electrical contact with the electrically conductive layers or display electrodes. Through holes are formed in the artificial tip. The electrically conductive vias are disposed in the through holes. A conductor (e.g., a strip of conductive silver paint) extends in electrical contact with each of the vias and each ledge conductor. The vias extend to an underside of the artificial tip.

All aspects of the device may utilize electrically conductive tabs adhered to the vias or to the ledge conductors and exposed at an underside of the artificial tip or the natural nail. These tabs engage the conductors of a color changing electronic device to enable switching of the electro-optic layer.

Also, all aspects of the device may utilize electrically conductive c-shaped crimps, clamps or clips fastened on the ledges each in electrical contact with one of the electrically conductive layers. The crimps might contact the display electrodes directly, or a protective layer of conductive carbon, silver paint or the like may be coated over the display electrodes; the crimps then directly contacting the conductive carbon or silver paint. The electronic skin can be injection molded with the polymer layer so as to be embedded therein. Electrically conductive metal tabs can extend from each of the crimps and protrude from a bottom of the polymer layer.

In another aspect of the display the polymer layer is formed by coating above and optionally below the electronic skin. Electrically conductive metal tabs extend from each of the crimps and protrude from a bottom of the polymer layer. This design can be made using forms.

Another embodiment features a method of changing a color of artificial nails. The artificial nails described above are provided. A device is provided having electronic drive circuitry that can apply a variety of selected voltages (e.g. voltage waveforms) capable of producing different colors when electrically addressing the electro-optic layer. An example of suitable drive schemes and electronics include, but are not limited to, the conventional drive scheme disclosed in U.S.

Pat. No. 5,644,330 implemented with either bipolar or unipolar drive chips. A display indicator on the device shows a plurality of colors each corresponding to one of the suitable voltages/waveforms to apply to each liquid crystal layer in the electronic skin to achieve the selected color. Each of the liquid crystal layers could be driven to the color reflective planar texture with an AC voltage pulse as is known in the art of cholesteric displays; e.g., U.S. Pat. Nos. 5,453,863 and 5,691,795. The device includes a seating surface or receptacle conforming to a shape of a bottom of a tip of the artificial color changing nail. Spaced electrical conductors extend on the seating surface and extend from the drive circuitry. The tip of the artificial nail is inserted onto the seating surface so that the electrical conductors of the display (e.g., via paint over the ledge conductors or metal interconnect tabs) contact the electrical conductors of the seating surface. A desired color is selected by moving a color selecting indicator near a desired color on the color display indicator. The drive circuitry is activated to produce a voltage corresponding to the selected color, the voltage being applied along the electrical conductors of the seating surface, to the ledge conductors and to the display electrodes flanking the electooptical layer, effective to enable the display to be switched to the selected color.

Referring to specific features of the method, the display can comprise the flexible electronic skin. The electro-optic material can comprise bistable liquid crystal material, in particular, bistable cholesteric liquid crystal material. The bistable cholesteric liquid crystal can comprise regions of the liquid crystal material dispersed in a polymer matrix. The at least one electro-optic layer can comprise at least two layers of bistable cholesteric liquid crystal material each having a pitch length effective to reflect light of different color than the other liquid crystal layer. The preferred liquid crystal layers can reflect red, green and blue light in any order.

It should be appreciated that relative terms such as proximal, distal, upper, lower, top, bottom, left, right, and the like are used only for purposes of illustration and should not be used to limit the scope of the invention as defined by the claims.

Many additional features, advantages and a fuller understanding of the invention will be had from the accompanying drawings and the detailed description that follows. It should be understood that the above Summary of the Invention describes the invention in broad terms while the following Detailed Description describes the invention more narrowly and presents preferred embodiments that should not be construed as necessary limitations of the broad invention as defined in the claims.

DETAILED DESCRIPTION OF THE INVENTION

Figure 1A:
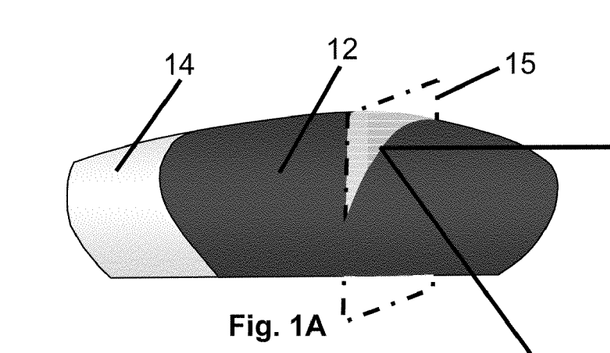
FIG. 1A is a top view of one embodiment of color changing artificial nails.
Figure 1B:
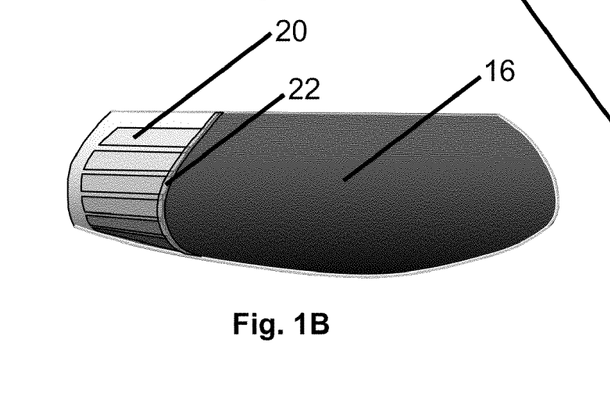
FIG. 1B is a bottom view of the artificial nails of FIG. 1A.

In FIG. 1A, as seen from a top view a color changing artificial fingernail 10 has a color changing area 12 (i.e., electro-optically active region) of a display or electronic skin 13 and an opaque tip portion (e.g., "French Tip") 14 used to hide electronic interconnects on the underside of the artificial nail. In FIG. 1B as seen from a bottom view the artificial fingernail includes a light-absorbing layer (e.g., back paint) 16 and a ledge 18 including ledge electrical conductors 20. If the electronic skin 13 is not embedded in a polymer matrix, an encapsulant 22 consisting of a UV cured resin or silicone can be coated between the ledge 18 and electro-optically active part of the electronic skin 12 and seals the electronic skin to prevent environmental contamination (water) from penetrating the electronic skin. The encapsulant embeds and seals the ledge. The ledge conductors 20 used to switch the electronic skin to a particular color are located under the tip portion 14 of the artificial fingernail. The ledge conductors may include either conductive polymer or ITO coated with a protective conductive coating such as conductive carbon or conductive silver. The ledge conductors could also be crimped metal foil with or without anisotropic conductive pressure sensitive adhesive (PSA) at the ledge of the display.

Figure 1C:
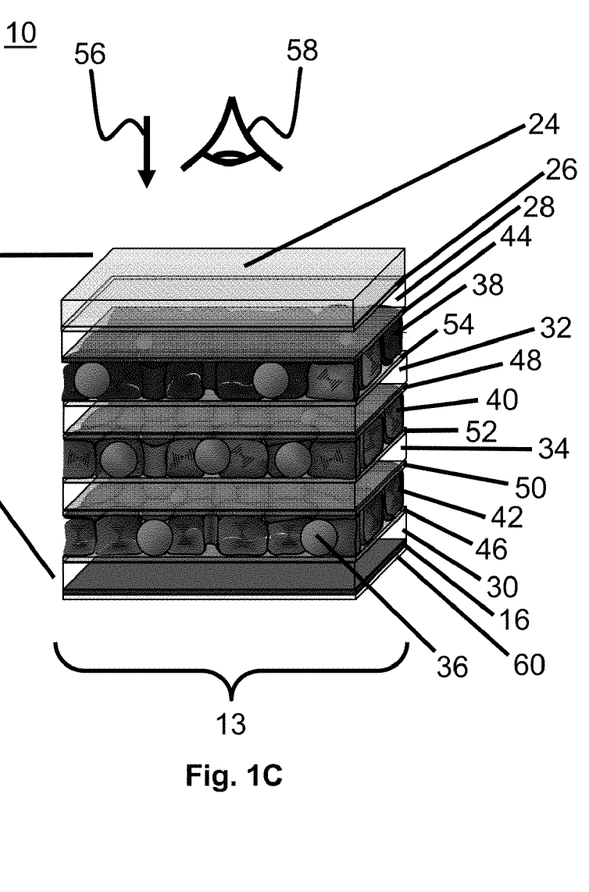
FIG. 1C is a cross-sectional view as taken along cutting plane 15 in FIG. 1A.

As shown in FIG. 1C the electronic skin 13 as seen from the cutting plane 15 is disposed beneath a clear polymer layer 24. The polymer layer can be a transparent or translucent hard plastic component in the shape of an artificial nail that the electronic skin is attached to. The clear polymer layer 24 can be preformed in the shape of the fingernail coated onto the upper surface of the display, or can be formed by injection molding so as to encapsulate the display while leaving the ledge protruding at the tip portion (e.g., beneath the French tip). The polymer layer can comprise polyurethane when the display is reaction injection molded with the plastic so as to be embedded therein. The polymer layer can be an acrylic polymer that the display is laminated to using a pressure sensitive adhesive or is glued to with a UV or visible light cured optional optical adhesive 26. The optional optically transparent adhesive layer 26 can be located between the polymer layer and the display for attaching these two components together. The polymer layer can be, for example, a UV curable acrylate, methacrylate or thiol-ene gel that the salon stylist would coat by brushing over top of the display that was professionally mounted using a form (artificial nail bed).

The display includes a plurality of transparent substrates. The substrates can be made of any suitable transparent polymer material of sufficient strength, for example, PET or polycarbonate. These include proximal and distal substrates 28, 30 (relative to the viewer) and intermediate substrates 32, 34 between adjacent layers of bistable cholesteric liquid crystal material. Spherical spacers 36 are located within each liquid crystal layer to set the gap between adjacent display electrodes. The display can include one, two, three or more liquid crystal layers (e.g., upper, middle and lower liquid crystal layers 38, 40 and 42). The intermediate substrates 32 and 34 are each disposed between adjacent liquid crystal layers. The upper intermediate substrate 32 is disposed between liquid crystal layers 38 and 40 while lower intermediate substrate 34 is disposed between liquid crystal layers 40 and 42. Each of the liquid crystal layers has chiral material in an amount effective to have a pitch length that reflects light of a certain color. The colors are different than each other and can include blue, green and red in the order shown or any order. In addition, the cholesteric liquid crystal in any two adjacent layers of 38, 40, and 42 may be the same color but of opposite handedness to enhance reflectivity. The liquid crystal material can include liquid crystal dispersed in a polymer matrix. The liquid crystal layer preferably is a cholesteric liquid crystal dispersion layer formed by polymerization induced phase separation (PIPS) as disclosed in the U.S. Pat. Nos. 7,351,506, 7,236,151 and 7,170,481.

The proximal and distal substrates 28, 30 each have a downwardly facing and upwardly facing electrically conductive layer (display electrode) 44, 46, respectively, disposed on one side thereof. The intermediate substrates 32, 34 have electrically conductive layers or display electrodes disposed on both sides thereof. Two of the display electrodes flank (i.e., are disposed on each side of) each liquid crystal layer. The intermediate substrates include downwardly facing display electrodes 48, 50 formed on one side thereof and upwardly facing display electrodes 52, 54 formed on the other sides thereof. The display electrodes can be patterned or unpatterned. These display electrodes are unpatterned as shown in FIG. 1C in which case the entire display acts like a single pixel to display light of a desired color. The unpatterned display electrodes completely cover the area of the corresponding substrate. The display electrodes are formed of any suitably conductive transparent conductors such as PEDOT-based conductive polymer or ITO.

The layer of light absorbing material 16 is disposed downstream of the liquid crystal layers (distal from the viewer) relative to a direction of incident light 56. The electronic skin is observed by a viewer at position 58. The light absorbing material absorbs light that passes through the liquid crystal layers enabling the display to have suitable contrast and to produce desired colors. The light absorbing layer can be any color but is often black. A layer of pressure sensitive or thermosetting adhesive 60 (e.g., adhesive used in MINX™ nails) can be disposed below the light absorbing layer for adhering the electronic skin to the natural nail.

Figure 2:
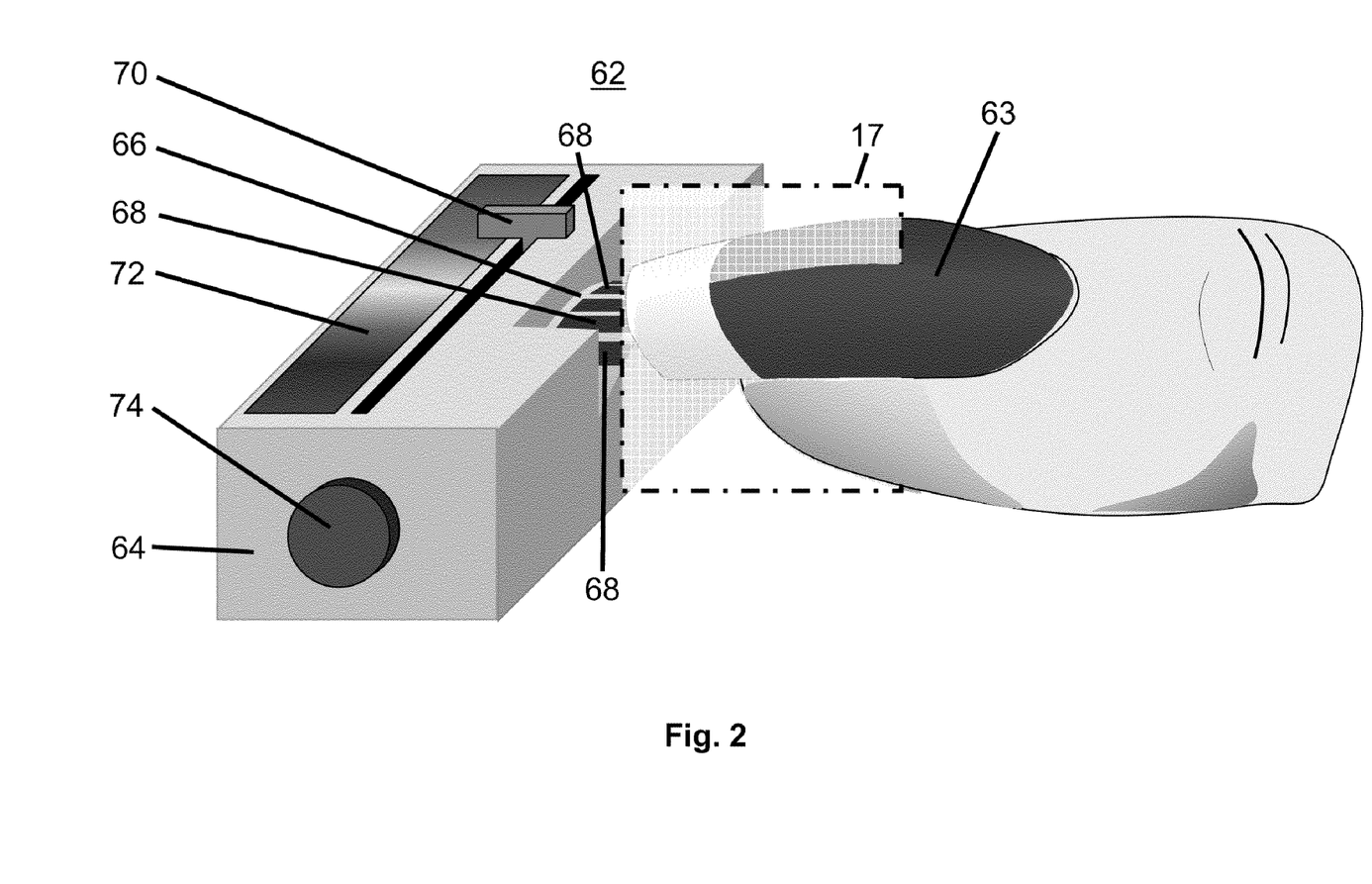
FIG. 2 is a perspective view of a color changing electronic device for changing the color of the artificial nails.

Referring to FIG. 2, a color changing electronic device 62 having a casing 64 is used to select the color of the artificial fingernail 63 that is attached to the finger of the user. Inside the electronic device is electronic circuitry adapted to provide appropriate voltage waveforms when selected and activated. The device includes a curved seating surface or receptacle 66 with 6 (or four) conductive electrodes 68 adapted to connect to the curved underside of the artificial nail. An indicator dial 70 is used to select the color of the electronic skin as shown by a display indicator 72 that displays a spectrum of colors. Movement of the dial will cause the drive electronics to select an appropriate voltage waveform. Once an update button 74 is depressed, the drive circuitry is activated so that the appropriate voltage waveform is sent to each individual (e.g., red, green and blue) liquid crystal layer of the display to update the artificial nail to the color selected by the dial 70. Each of the layers could be driven to the color reflective planar texture with an AC voltage pulse as is known in the art of cholesteric displays; e.g., U.S. Pat. Nos. 5,453,863 and 5,691,795.

Any means for addressing the liquid crystal known in the art, and preferably adaptable to a display having deformability may be used. In the preferred electrically addressable displays, the means for addressing the liquid crystal will be drive and control electronics for application of driving voltages across the liquid crystal material in accordance with any suitable drive scheme known to those of ordinary skill in the art. Examples of suitable drive schemes and electronics include, but are not limited to, the conventional drive scheme disclosed in U.S. Pat. No. 5,644,330 implemented with either bipolar or unipolar drive chips, the dynamic drive scheme disclosed in U.S. Pat. No. 5,748,277 or 6,154,190 for faster or lower temperature response, the cumulative drive scheme disclosed in U.S. Pat. No. 6,133,895, for near video response, and the Multiconfiguration Display Driver disclosed in the Ser. No. 10/782,461 patent application, all of which are incorporated herein by reference.

The color changing nails shown in FIGS. 1A-C may be in the form of Prescription Nails™ which are preformed artificial nails having the size and shape of natural nails but with tips extending beyond the length of natural nails. The preformed artificial nails can come in a variety of shapes and sizes to accommodate all different nail types. The clear polymer layer 24 is the preformed artificial nail and the display or electronic skin 13 is adhered to the bottom of the artificial nail using optical adhesive 26. A process of applying these nails includes the step of preparing the natural nail. A pressure sensitive adhesive or thermosetting resin 60 is applied to the nail leaving approximately 1/16 of an inch of space near the cuticle. This is followed by application of the electronic skin 13 onto the adhesive. Next, the artificial nail 24 is applied onto the electronic skin with optical adhesive 26 between them. This process can be modified so that the electronic skin is thermoformed onto the preformed artificial nail or is bonded with adhesive to the bottom of the nail. Then the artificial nail with attached electronic skin is adhered to the natural nail with the pressure sensitive or thermosetting adhesive 60. In this or in any of the other embodiments of this disclosure an opaque tip member (such as a French tip) or opaque paint 14 can be used at an end of the artificial nail (preformed or formed by coating) so as to cover the ledge and the electrical interconnects from view.

Another technique for applying the color changing artificial nails of FIGS. 1A-C is using Dual System™ forms or PopIts™. In this approach, forms that are made of a rubbery plastic and in the shape of the artificial fingernail are inverted, concave side up. Then, acrylic or gel is applied into the mold forming the clear polymer layer 24. This is then partially cured and then the electronic skin 13 with ledges 18 and ledge conductors 20 is pressed into the gel, inverted from the position of FIG. 1C. Pressure sensitive adhesive or thermosetting adhesive 60 is applied onto the bottom of the electronic skin or on the natural nail. Then, the form is inverted and pressed onto the natural nail. The polymer is cured and the rubbery plastic form pops off, leaving the finished artificial nail. The process can be modified to build an artificial tip into the form, embedded into the acrylic or gel above the electronic skin.

Figures 3A, 3B:
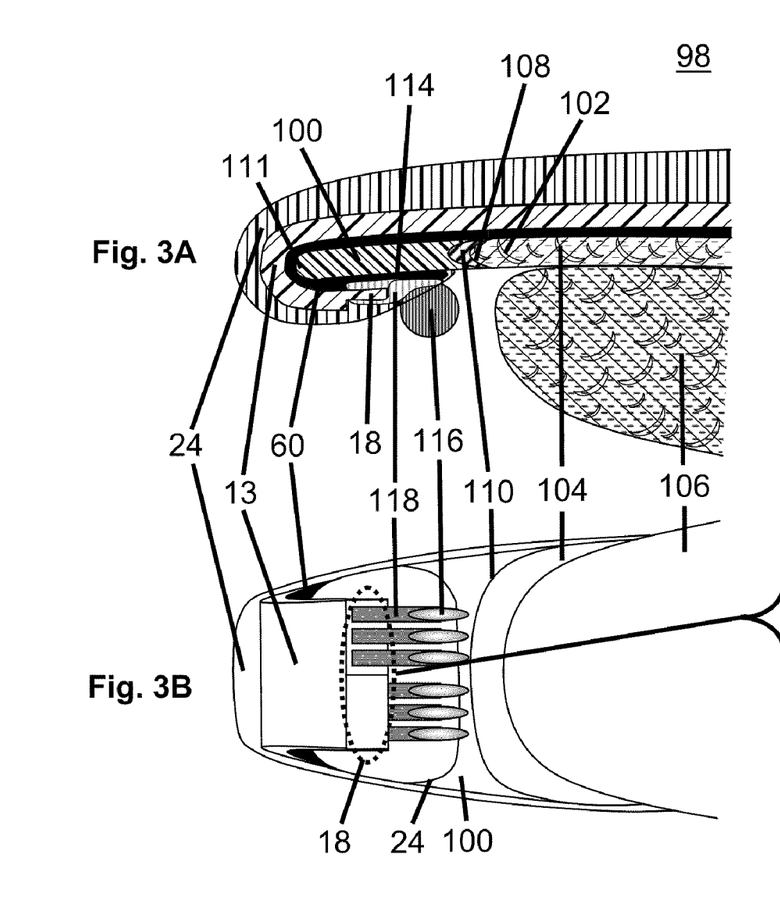
FIG. 3A is a sectional view of another embodiment of the color changing artificial nails as taken from the cutting plane 17 in FIG. 2.
FIG. 3B is a bottom view of the artificial nails shown in FIG. 3A.

Referring to cut-plane 17 of FIG. 2 of a color changing artificial nail 98, we see in cross-section in FIG. 3A one way of mounting the electronic skin 13 and polymer layer 24 to a fingernail is to fold under the electronic skin at the tip portion 14 of the polymer layer at the end of the tip 111 of the nail. This design employs a preformed artificial tip 100 that is adhered at the end 102 of a natural nail 104 on the end of a finger 106. The artificial tip is shown as abutting the end of the natural nail 108 in a cantilever fashion. Alternatively, the preformed artificial tip could be placed on top of the natural nail 104 so as to overhang the tip 108 of the natural nail. The preformed artificial tip 100 is fixed into position with adhesive 110. The pressure sensitive adhesive or thermosetting resin 60 is located above the natural nail and on a top surface of the preformed artificial tip, around an end 111 of the artificial tip, as well as on an underside 114 of the preformed artificial tip. The electronic skin 13 as described in FIG. 1C is held onto the natural nail and the preformed artificial tip by the pressure sensitive or thermosetting adhesive 60. The electronic skin 13 includes the ledge 18 that is composed of polymer substrates that extend beyond the perimeter of the electronic skin. The display electrodes of the electronic skin extend onto upper and lower surfaces of the ledge, as shown in detail in FIG. 3C. Ledge conductors 20 are coated over the display electrodes on the ledges and continue along a surface of the preformed artificial tip. Over the ledge conductor layer 20 can be formed silver conductive paint or conductive carbon 118. The interconnect tabs 116 can be connected to the ledge via the conductive silver paint 118. Optionally, the interconnect tabs can be formed of electrically conductive metal such as c-shaped crimps that are one solid piece containing both parts 118 and 116 where the crimps are attached to the ledge conductor layer 20 by compressing the c-shaped metal 118 around the substrate sandwich (28; 28 and 32; 28, 32, and 34; 32, 34 and 30; 34 and 30; 30). It is important to note that half of the c-shaped crimp is insulated so that it does not electrically connect the conductor on the proximal side to the conductor of the distal side (or vice-versa). Regardless of how the interconnect tab is formed; it must enable the conductor of the ledge to electrically connect through the tabs 116 to the electronic device 62 to change the color of the electronic skin 12. The clear polymer layer 24 is applied as an outer surface of the device. The polymer layer can be comprised of any material used to form artificial nails such as rapid setting acrylic polymer and monomer or an acrylic gel. Components might be applied onto the clear polymer layer 24 above the display to provide the artificial nails with strength such as a thin layer of woven fiberglass or silk material. The clear polymer layer 24 would be disposed above and below the fiberglass cloth over the display. The polymer layer 24 is given the shape of the fingernail when coated above the nail and is also coated on the underside of the device. When this coating is carried out, the user must ensure that the polymer does not cover the metal interconnect tabs 116 if used, or the ledge electrodes 20 if no metal interconnect tabs 116 are used.

Figure 3C:
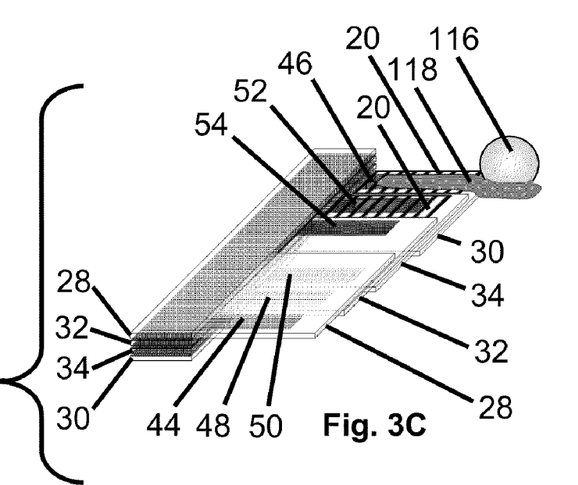
FIG. 3C is a view of the ledge of artificial nails.

Referring to FIG. 3C, the ledge 18 is formed of the substrates that comprise the display. In the example there are 4 substrates: one proximal and one distal substrate 28, 30 and two intermediate substrates 32, 34 between the proximal and distal substrates. The electrodes are unpatterned in this example, covering an entire area of the substrates in the active area of the display. Wherever the electrodes flank the liquid crystal material between the substrates is formed the electro-optically active area 12 that can reflect light or transmit light to the light absorbing material at the back of the electronic skin. Downwardly facing electrodes are located on the proximal substrate (electrode 44), and on the bottom of intermediate substrates 32 and 34 (electrodes 48, 50, respectively). Upwardly facing electrodes are located on the distal substrate 30 (electrode 46) and on the top of the intermediate substrates 32 and 34 (electrodes 54, 52, respectively). A strip of the display electrode material (e.g., conductive polymer, carbon nanotubes, ITO or other electrode material) is shown extending onto each exposed substrate portion (44, 48, 50, 54, 52, 46). The ledge 18 can be formed of portions of each of the substrates (28, 32, 34, 30) of the display 12 extending beyond the active area of the display, on which the display electrodes (44, 48, 50, 54, 52, 46) are disposed. Portions of the substrates and electro-optic material are removed, by forming perforations with a laser, tearing away the substrate portions and then removing the layer of electro-optic material, so as to form staggered ledges of substrate and display electrode as seen in FIG. 3C. Although the display electrodes are shown for ease of illustration as rectangular strips, the display electrode can occupy the entire surface of each substrate. Also, the electro-optic material is not removed from regions of the ledge where the substrates overlap. Disposed on the display electrode material is a ledge conductor layer 20 of conductive carbon or conductive silver. This protects and seals over the display electrodes. On top of this is formed a layer of silver conductive paint 118 making the connection from the conductors formed on the ledge and each metal interconnect tab 116. The silver paint can extend beyond the ledges onto the adhesive 60, or onto the artificial tip 100 if no adhesive is used beyond an end of the ledge. The metal interconnect tabs 116 are disposed in contact with the silver paint. Although only a single layer of silver paint 118 and two ledge conductor coatings 20 are shown in FIG. 3C to illustrate how the conductors are built up, it should be appreciated that the silver paint would be disposed on each of the ledge conductor layers 20 which is disposed over each of the display electrodes, each line of paint contacting one of the metal interconnect tabs. The ledge can be formed as described here for each of the other embodiments, with variations that would be apparent to one of ordinary skill in the art in view of this disclosure.

The following is a process for preparing the fold under electronic skin of FIGS. 3A-3C. The natural nail is prepared in a conventional manner for application of artificial nails. The preformed artificial tip 100 is then fixed in position onto a top surface of the natural nail or in a cantilever position as shown; using resin such as a pressure set adhesive 110. Pressure sensitive or thermosetting adhesive 60 is then applied over top of the nail and preformed artificial tip, as well as around the free end 111 of the artificial tip and under the artificial tip at lower surface 114. Alternatively, the pressure sensitive adhesive or thermosetting resin 60 can be applied onto a surface of the electronic skin. The pressure sensitive or thermosetting adhesive 60 can extend up to or under the ledge. Then, the electronic skin 13 is adhered into position by pressing down on it over the top surface of the natural nail, folding over an end of the preformed artificial tip and pressing the electronic skin underneath the end of the preformed artificial tip. The clear polymer layer 24 is then coated or painted onto the electronic skin in the size and shape of the natural nail, over the top surface of the natural nail, around an end of the artificial tip, and under the artificial tip. It will be appreciated that the polymer layer could extend onto the underside of the natural nail as well, depending on a length of the natural nail. The applicator (e.g., nail salon technician) must ensure that the polymer layer 24 does not cover the metal interconnect tabs if used, or the ledge conductors if no metal interconnect tabs are used. The artificial nail can then be finished and shaped as desired by the user, taking care not to remove the polymer layer so as to intrude on the integrity of the electronic skin. The metal interconnect tabs 116 are adapted to engage the conductors 68 formed on the receptacle 66 of the electronic switching device 62 so as to apply voltages to the conductors that lead to the display electrodes to change the color of any or all of the liquid crystal layers and the resulting overall color of the display.

In a variation of the device shown in FIGS. 3A and 3B, the natural nail 104 is longer than what is shown in FIG. 3A and takes the place of the preformed artificial tip 100. In this case, the steps of applying the color changing fingernail device are similar. The nail is prepared. The pressure sensitive or thermosetting adhesive 60 is applied onto the natural nail or the electronic skin 13 in position on the top surface of the natural nail, around an end of the natural nail and on an underside of the natural nail. The electronic skin 13 is adhered to the adhesive 60 on the top of the natural nail, is folded around an end of the natural nail, and is adhered via the adhesive to the underside of the natural nail. The ledge 18 and its interconnects are integrally formed with the electronic skin. The ledge conductors 20 extending on the ledge are over-coated with silver paint and are adhered to the adhesive 60 or to the natural nail. The metal interconnect tabs 116 can be applied onto the ledge conductors 20 and silver paint 118 or may be preformed onto the ledge conductors 20 and silver paint 118. The clear polymer layer 24 is applied onto the electronic skin 13 so as to take on the size and shape of the natural nail above the nail, extends around the end of the nail and then is applied to the underside of the natural nail. The artificial nail can then be finished and shaped as desired by the user, taking care not to remove the polymer layer so as to intrude on the integrity of the electronic skin. The metal interconnect tabs 116 are adapted to engage the conductors 68 formed on the receptacle 66 of the electronic switching device 62 so as to apply voltages to the conductors that lead to the display electrodes to change the color of any or all of the liquid crystal layers and the resulting overall color of the display.

Figure 4A:
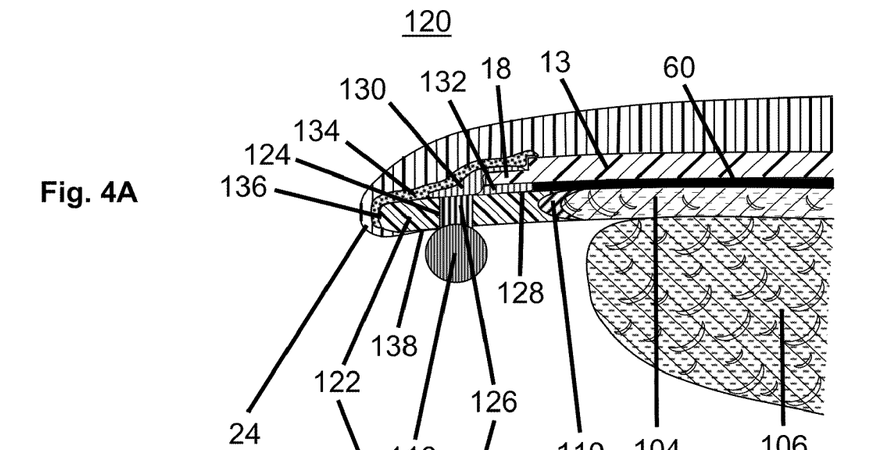
FIG. 4A is a cross-sectional view as taken from the cutting plane 17 of FIG. 2.

In another embodiment, referring to cutting plane 17 in FIG. 4A and the bottom view 4B, the color changing nails 120 employ vias for electrical connection. A preformed artificial tip 122 is made with six through holes 124 in it. Electrically conductive material is filled in each through hole forming a via 126 in each hole. The preformed artificial tip 122 is fastened to the natural nail 104 either on an upper surface of the nail so as to overhang an end of the natural nail or in abutment with an end of the nail in cantilever fashion as shown. The pressure set adhesive 110 is used to adhere the preformed tip 122 onto the natural fingernail. The pressure sensitive or thermosetting resin 60 is applied onto the natural nail 104 and over a top surface 128 of the preformed artificial tip. Extending from the electronic skin is the polymeric ledge 18. Downwardly facing electrodes extend from the electronic skin onto lower surfaces of the ledge while upwardly facing electrodes extend from the electronic skin onto upper surfaces of the ledge. The configuration of the ledge and electrical interconnects is as shown in FIG. 3C. Ledge conductors 20 are painted or coated over the display electrodes on the ledges. Top facing silver paint 130 extends onto a top surface of the ledge over the display electrodes on the top surface 128 of the artificial tip while bottom facing silver paint 132 extends on a bottom surface of the ledge over the display electrodes on the top surface 128 of the artificial tip. Each of the top facing silver paint 130 conductors and bottom facing silver paint 132 conductors extends over the top surface of one of the vias 126. As shown in 120 there are six display electrodes over-coated with six ledge conductors and 6 strips of silver paint into contact with an upper surface of six vias. The electronic skin is adhered onto the natural nail with the adhesive 60. The adhesive may be formed on the natural nail or on the electronic skin. An opaque paint 134 is painted over the ledge 18, the ledge conductors 20, 130, 132 and the artificial tip 122. Six metal interconnect tabs 116 are electrically connected to the bottom of each via or alternatively, the tabs 116 are absent and the vias act as the electrodes for the interconnect to the separate electronic device 62. The clear polymer layer 24 is then applied onto an upper surface of the electronic skin 13 to take on the size and shape of the natural nail, over the opaque paint 134, around an end 136 of the preformed artificial tip, and optionally onto a lower surface 138 of the artificial tip. The encapsulant 22 for the ledge (FIG. 1B) is formed by the polymer layer 24 and/or material 134. It will be appreciated that the polymer layer can extend onto the lower surface of the natural nail depending on a length of the natural nail. Components might be applied onto the clear polymer layer 24 above the display to provide the artificial nails with strength such as a thin layer of woven fiberglass or silk material. The clear polymer layer 24 would be disposed above and below the fiberglass cloth over the display.

Figure 4B:
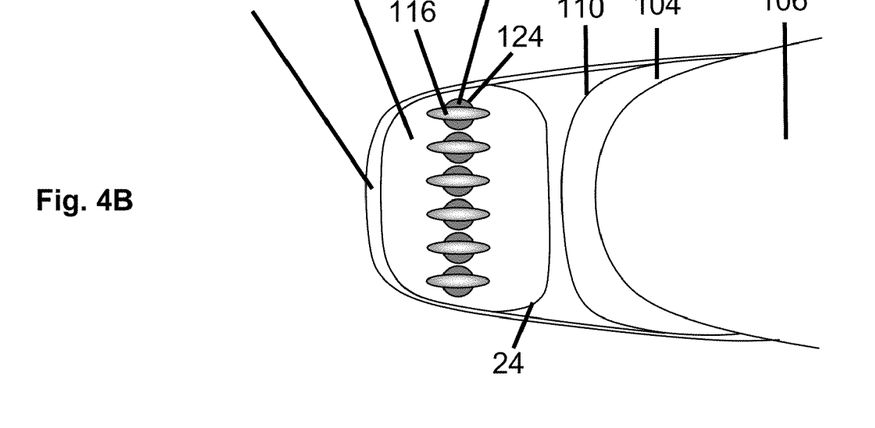
FIG. 4B is a bottom view of the artificial nail of FIG. 4A.

A method for applying the color changing nails of FIGS. 4A and 4B is to first prepare the natural nail bed 104 in a conventional manner as discussed previously. The preformed artificial tip 122 is adhered onto the natural nail so as to overlap the natural nail or into abutment with an end of the natural nail in cantilever fashion as shown in FIG. 4A. The preformed artificial tip includes the six through holes 124 each containing a conductive via 126. The pressure set adhesive 110 adheres the artificial tip 122 to the natural nail. The pressure sensitive or thermosetting adhesive 60 is applied onto the natural nail and on the top surface 128 of the preformed artificial tip 122. Or, the adhesive 60 is applied to an underside of the electronic skin 13. The electronic skin being flexible assumes the contour of the natural fingernail. The electronic skin is adhered to the adhesive 60 by applying pressure or heat. The ledge conductors 20 extend from the electronic skin onto the ledges and can be preformed with the display. Alternatively, the paint conductor 118 could be painted 130, 132 onto the top and bottom ledge surfaces and onto the artificial tip to each via at the time of application. The opaque paint 134 is painted over the ledge, the ledge conductors and end of the artificial tip or an opaque plastic member is positioned over the ledge and ledge conductors and vias. The metal interconnect tabs 116 are either already integrally formed onto each via or are now applied there. In one design the artificial tip 122 with vias is already connected to the ledge conductors 20 using conductive paint and the metal interconnect tabs 116 are located beneath the vias; the artificial tip 122 being adhered to an end of the electronic skin 13 or integrally formed with it. In another design, the artificial tip 122 with vias is already connected to the ledge conductors 20 using metal c-shaped crimps 130 and 132 that are integral to the vias 126 and interconnect tabs 116, i.e., one metal part that is the interconnect has the tip injection molded around it and is then crimped onto the ledge 18 of the display. The clear polymer layer 24 is then applied onto a top surface of the electronic skin 13 in a shape of the natural nail, around an end 136 of the artificial nail tip and optionally onto the underside 138 of the artificial nail tip. Care should be taken not to let the polymer layer cover the metal interconnect tabs, or if no metal interconnect tabs are used, then the polymer layer 24 must not be located onto the vias. The vias may extend out the bottom of the through holes more than what is shown in FIG. 4A if the metal interconnect tabs are not used—in this case, the vias will act as interconnect electrodes. The metal interconnect tabs 116 are adapted to engage the conductors 68 formed on the receptacle 66 of the electronic switching device 62 so as to apply voltages to the receptacle conductors 150 that leads to the display electrodes to change the color of any or all of the liquid crystal layers and the resulting overall color of the display.

Figures 5A, 5B:
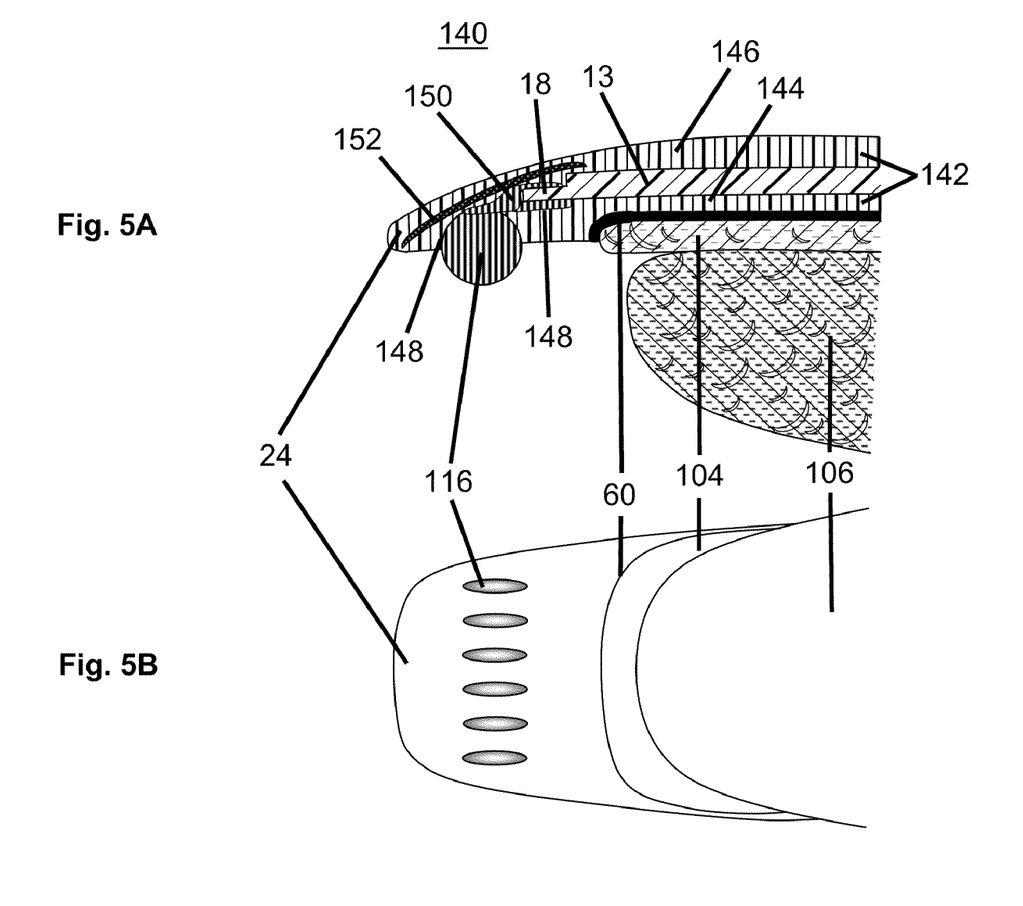
FIG. 5A is a cross-sectional view of another embodiment of artificial nail as taken from the cutting plane 17 of FIG. 2.
FIG. 5B is a bottom view of the artificial nail of FIG. 5A.

Referring to FIGS. 5A and 5B, another embodiment features electronic color changing nails 140 in which the display 13 is molded into the clear polymer layer 24. One way this could be achieved is by reaction injection molding the display 13 into the clear polymer layer 24. The injection molded nails can be pre-shaped, formed and cut into a variety of sizes suitable to accommodate every person's nail type and size. This provides an artificial nail having a size and shape that approximates and accommodates the size and shape of any natural nail. The artificial nail includes polymer layer 24 having a body 142 that is secured to the natural nail using pressure sensitive or thermosetting adhesive 60. The encapsulant 22 for the ledge (FIG. 1B) is formed by polymer layer 24 (i.e., body 142). The body and the adhesive beneath it may extend to within, for example, 1/16 of an inch away from the cuticle. The polymer layer 24 includes a lower portion 144 beneath the display 13 and an upper portion 146 above the display 13. The display 13 may be an electronic skin or it may be a more rigid display. There is a cavity 148 in the clear polymer layer 24 around the ledge and leading to a lower surface of the artificial nail. Disposed in this cavity are metallic interconnect crimps 150 that directly attach to the ledge of the electronic skin. Metal interconnect tabs 116 extend in the cavity 148 and protrude from the bottom surface of the artificial nail 140. In the example shown there are 6 metal interconnect crimps 150 extending from 6 display electrodes on the ledges 18, which lead to 6 metal interconnect tabs 116, that may or may not be integral to the crimps 150. The ledge conductor 20 and/or silver paint 118 may be formed over the display electrodes to which the crimps are fastened. A layer of opaque paint or opaque plastic 152 is formed over the ledges and the metal interconnect crimps and tabs so as to hide these components. The paint can assume the shape of a tip of the artificial fingernail such as a French tip. The metal interconnect tabs 116 are adapted to engage the conductors 68 formed on the receptacle 66 of the electronic switching device 62 so as to apply voltages to the conductors 150 that lead to the display electrodes to change the color of any or all of the liquid crystal layers and the resulting overall color of the display.

The color changing fingernails 140 as taken from the cutting plane 17 in FIG. 2, as seen in FIG. 5A and the bottom view 5B, are prepared in the following manner. The electronic skin 13 is formed with the ledges and the display electrodes that are covered by conductive material 20 extending on each of the ledges as shown in FIG. 3C. The metal interconnect crimps 150 are clamped to each of the display electrodes or to conductive carbon 20 and/or silver paint 118 over the display electrodes. The electronic skin 13 is reaction injection molded with the clear polymer layer 24 of polyurethane so as to embed the electronic skin within the upper and lower portions 146, 144 of the polymer layer. Reaction injection molded in the polymer layer is the opaque member 152 that covers the ledge 18 and the metal interconnect clamps 150 and tabs 116. As an alternative to reaction injection molding, the display 13 and interconnect module (150, 116) can be painted as at 134 to obscure the ledge. This forms the reaction injection molded artificial nail with protruding metal interconnect tabs. The whole display/interconnect module with integral "French tip" is then inserted into a clear (to UV/visible light) mold where photo-polymerizable acrylate and/or methacrylate monomer, crosslinker and photoinitiator are injected around the module. The system is then photo-cured with UV and/or visible light from the top and bottom through the clear mold to form the solid body 142 of the artificial fingernail with an embedded display. The natural nail bed 104 is prepared as previously discussed. Pressure sensitive or thermosetting adhesive 60 is placed on the natural nail or on the underside of the molded artificial nail. The molded artificial nail 140 is then adhered onto the natural nail. Any top coats can be applied onto the artificial nail if desired such as when objects or material are embedded onto the artificial nail (e.g., glitter or rhinestones).

Figures 6A, 6B:
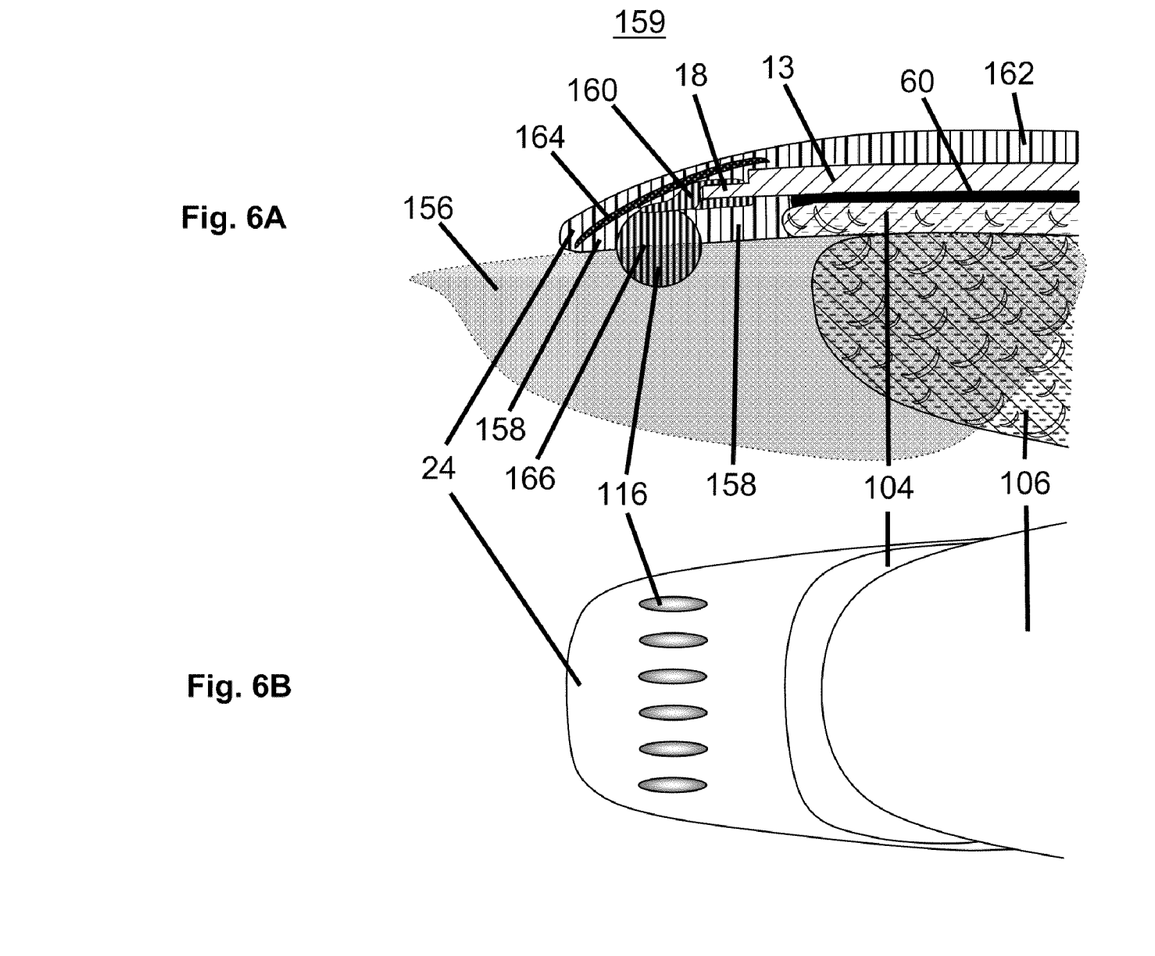
FIG. 6A is a cross-sectional view of another embodiment of artificial nail as taken from the cutting plane 17 of FIG. 2.
FIG. 6B is a bottom view of the artificial nail of FIG. 6A.

Referring to FIGS. 6A and 6B, another embodiment features electronic color changing fingernails 159 that are formed onto the natural nail in situ by coating of the clear polymer layer 24 over the electronic skin 13. In referring to the cut-plane 17, we see in cross-section in FIG. 6A a disposable form 156 positioned beneath the tip of the natural nail and around an end of the finger. The form includes a cutout that exposes the natural nail but connects, such as with a temporary pressure set adhesive or tabs, to the finger 106 of the user for stability. In addition, the form also contains through-hole cutouts 166 for the interconnect tabs 116 to fit into. The polymer layer 24 includes a lower portion of material 158 that is applied beneath the electronic skin onto the form 156. The electronic skin 13 being flexible and cut to size assumes a shape and size of the natural nail 104. The electronic skin 13 includes the ledge 18 and interconnects as shown in FIG. 3C. Metal interconnect c-shaped crimps 160 extend from the display electrode material disposed on each ledge and extend to a metal interconnect tab 116. The crimps 160 and interconnect tabs 116 may be one solid integrated part. In this example the display electrodes are unpatterned so that wherever the liquid crystal material is flanked by the electrodes the material is electro-optically active. In 159 there are 6 display electrodes, six metal interconnect crimps 160 extending from the display electrodes or from protective conductive carbon 20 and/or silver paint 118 disposed over the display electrodes and 6 metal interconnect tabs 116, one connected to each of the metal interconnect crimps 160. A pressure sensitive or thermosetting adhesive 60 is disposed on the natural nail. It can extend from near the cuticle, for example, from about 1/16 inch away from the cuticle to the end of the natural nail. The electronic skin 13 with ledges and integral interconnect crimps/tabs is first placed with the interconnect tabs 116 recessed into the through-holes 166 of the form and then set on top of the polymer disposed on the form and on the PSA or thermosetting resin 60. The electronic skin 13 is adhered to the adhesive 60 and is fixed into position above the natural nail. The electronic skin can have any shape but may approximate the shape of the natural nail. An upper portion 162 of the clear polymer layer 24 is optionally coated over the ledge 18 and metal interconnect clamps 160. The encapsulant 22 for the ledge (FIG. 1B) is formed by polymer material 24 (i.e., 162 and 158). An opaque paint or opaque member 164 is positioned or applied over the polymer layer 24 coated over the ledge 18 and metal interconnect clamps 160 or positioned directly on top of the ledge 18 and metal interconnect clamps 160. This is followed by applying the upper portion 162 of the clear polymer layer 24 as a coating over the opaque paint or opaque member to form a tip and on top of the electronic skin 13 in the shape of the natural nail. Components might be applied onto the clear polymer layer 24 above the display to provide the artificial nails with strength such as a thin layer of woven fiberglass or silk material. The clear polymer layer 24 would be disposed above and below the fiberglass cloth over the display.

In a method of applying the artificial nail 159 of FIGS. 6A and 6B, the electronic skin 13 with ledge 18 is formed. This includes the display electrodes on the ledge 18, any protective conductive carbon or silver coating 20 over the display electrodes and any silver paint 118 on the conductive carbon layer, and the metal interconnect crimps 160 extending from each display electrode. The form 156 is positioned under the natural nail and temporarily affixed to the finger 106. The form includes six through holes 166 for receiving the metal interconnect tabs 116. The pressure sensitive or thermosetting adhesive 60 is applied onto the natural nail or onto the electronic skin 13. The lower portion 158 of the polymer layer 24 is applied onto the forms beyond the end of the natural nail in a shape of a fingernail tip. The electronic skin 13 is secured in position by the metal interconnect tabs 116 extending through the through holes 166 of the form and then is adhered to the natural nail with the adhesive 60. The electronic skin also rests on the polymer layer (e.g., acrylic) 158 on the form.

Excess acrylic from 158, that may have been deposited when the tabs were place into the through-holes, is cleared off the interconnect tabs 116 on the underside of the form. The opaque member or paint 164 is applied so as to cover the ledge 18, the metal interconnect clamps 160 and tabs 116. This is followed by a coating of the upper portion 162 of the polymer layer over the electronic skin 13 in the shape of the natural nail and the opaque member or paint 164 above the natural nail surface so as to form the artificial fingernail including the tip. The electronic skin can be switched using the separate electronic switching device 62 by inserting the fingernail onto the conductive strips 68 of the receptacle 66. Voltages are applied by the device to the conductors 68, to the metal interconnect tabs 116, along the clamps 160 (along silver paint 118 and/or conductive carbon 20) and to the display electrodes so as to change the color of each or all of the liquid crystal layers and to achieve an overall desired color of the electronic skin.

One way to form the polymer layer in situ as described in connection with FIGS. 6A and 6B is to use liquid acrylic monomer and acrylic polymer powder. When mixed, this will polymerize in about 3 minutes. A first step is to prepare the natural nail bed in a known manner including applying an antibacterial product to the nail. Primer can be added to the natural nail. The electronic skin is applied to the nail using pressure sensitive or thermosetting adhesive, spaced from the cuticle by about 1/16 inch. Plastic wrap can be used to hold objects such as the electronic skin in place for curing. The space by the cuticle is used to enable the acrylic to encapsulate the electronic skin. An orange wood stick can be used to smooth out the electronic skin on the adhesive, making it more uniform. The acrylic is applied by dipping a brush into the monomer and then into the polymer powder. The acrylic is applied above and optionally below the electronic skin to cover the natural nail bed and to form a tip extending beyond an end of the natural nail. Sculpting forms and plastic tips can be used to create a longer free edge (length) of artificial nail. A plastic artificial tip would be applied with a resin (glue) recommended by the product company onto the prepared nail bed before the acrylic is applied. Any object that can fit onto the nail bed can be encapsulated by the acrylic polymer such as glitter, rhinestones, mylar, Fimo, clay canes, and stickers. Topcoats can be applied over the embedded objects or over a top surface of the polymer layer to provide UV protection or achieve high shine, for example.

The artificial nails can employ porcelain material (finely ground glass material) in the polymer powder, which produces a harder surface. Formation of a porcelain-containing polymer layer is conducted as described above in connection with the in-situ artificial nails using acrylic polymer.

The polymer layer can be formed in-situ using the acrylic dip system. This involves applying bonder liquid onto the electronic skin that is adhered to the nail. Then the finger is dipped into acrylic polymer (resin) powder. Resin activator may then be sprayed onto the polymer, facilitating curing of the polymer. Repeated layers of bonder, nails dipped into acrylic and application of activator is carried out until a desired thickness is achieved. This process can be used for an overlay where no apex (arch) is desired in the nail.

Another way of forming in-situ artificial nails is using gels. The gel includes pre-mixed polymers and monomers forming a gel consistency, which can be cured or set (hardened) under UV light. Non UV nails apply a gel activator on the gel to cure. This process includes the step of preparing the nail by cleaning and applying an antibacterial solution. A primer can be applied to the natural nail. Applied on top of the electronic skin that has been adhered to the nail is bonder liquid that is cured. Next, thin layers of builder gel are applied onto the electronic skin and cured completely (as by application of UV light) leaving a tacky dispersion layer (that typically remains due to oxygen inhibition of the polymerization reaction). If filing is required the tacky dispersion layer can be removed first. Top gloss can be applied and then cured. Cuticle oil can be applied. Sculpting forms and plastic tips can be used to create a longer free edge (length). Plastic artificial nail tips could be placed inside the gel layer formed as described above. Objects can be embedded in the gel and then cured.

Another procedure for forming artificial nails in-situ is using the process by Tough Enough Nails™. This process is the same as for the gel application except that no bonder is needed and no tacky dispersion layer forms nor does it need cleaning away. The gel of this process is applied as a coating onto the electronic skin.

Another process for forming artificial nails in situ utilizes fiberglass material. In this process, the nail is prepared. The electronic skin is adhered to the nail using pressure sensitive adhesive or thermosetting adhesive. Then, a layer of resin with activator is applied over the electronic skin. This is followed by applying a thin fiberglass layer of silk or linen precut in the desired shape. Next, one or more layers of resin and activator are applied over the fiberglass layer to embed it in the polymer layer until a desired thickness is achieved. The resin can be filed smooth with a gloss buffer, buffed to a high shine or several coats of glaze sealer can be applied.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. Artificial color changing nails comprising
a layer of polymer in a general size and shape of a human natural nail, said polymer layer including a body that can be placed in a fixed position above said natural nail and a tip near a free end of said natural nail; and
a display that can be stacked in a fixed position on said natural nail relative to said polymer layer comprising at least one electro-optic layer of bistable electro-optic material, and electrically conductive layers disposed on either side of said electro-optic layer;
a ledge extending from said display that is disposed at said tip, said electrically conductive layers being disposed on said ledge; and
wherein said electro-optic layer is able to stably display different colors or images in an absence of an electric field but changes colors or images in response to voltages applied to said electrically conductive layers.

2. The artificial color changing nails of claim 1 comprising electrical ledge conductors disposed on said ledge in electrical contact with said electrically conductive layers.

3. The artificial color changing nails of claim 1 wherein said display comprises a layer of light absorbing material disposed downstream of said optically active layer relative to a direction of light incident on said display.

4. The artificial color changing nails of claim 1 wherein said polymer layer comprises a preformed artificial nail.

5. The artificial color changing nails of claim 1 wherein said polymer layer comprises polymer that is coated over said display.

6. The artificial color changing nails of claim 1 wherein an end of said body opposite to said tip is located in close proximity to a cuticle of the nail.

7. The artificial color changing nails of claim 1 wherein an end of said body opposite to said tip is spaced from a cuticle of the nail.

8. The artificial color changing nails of claim 1 comprising a layer of pressure sensitive or thermosetting resin disposed beneath said display in contact with a surface of the natural nail.

9. The artificial color changing nails of claim 1 comprising a layer of adhesive disposed between said display and said polymer layer.

10. The artificial color changing nails of claim 1 wherein said electro-optic material comprises bistable liquid crystal material.

11. The artificial color changing nails of claim 10 wherein said liquid crystal comprises bistable cholesteric liquid crystal material.

12. The artificial color changing nails of claim 11 wherein said bistable cholesteric liquid crystal comprises regions of said liquid crystal material dispersed in a polymer matrix.

13. The artificial color changing nails claim 12 wherein the at least one said electro-optic layer comprises at least two layers of said bistable cholesteric liquid crystal material each having a pitch length effective to reflect light of different color than the other liquid crystal layer.

14. The artificial color changing nails of claim 13 wherein said liquid crystal layers reflect red, green and blue light.

15. The artificial color changing nails of claim 1 wherein said polymer layer is formed by injection molding and encapsulates said display.

16. The artificial color changing nails of claim 1 comprising pressure sensitive adhesive or thermosetting adhesive disposed between said display and said nail.

17. The artificial color changing nails of claim 1 wherein said display comprises flexible electronic skin.

18. The artificial color changing nails of claim 17 wherein said electronic skin is folded over itself at the tip.

19. The artificial color changing nails of claim 18 comprising a preformed artificial tip adhered in abutment with or overlapping said natural nail, said electronic skin being folded around an end of said artificial tip, and electrical ledge conductors disposed on said ledge in electrical contact with said electrically conductive layers, said ledge conductors being exposed at an underside of said artificial tip.

20. The artificial color changing nails of claim 17 comprising a preformed artificial tip adhered in abutment with or overlapping said natural nail, electrical ledge conductors disposed on said ledge in electrical contact with said electrically conductive layers, through holes formed in said artificial tip, electrically conductive vias disposed in said through holes, and a conductor extending in electrical contact with said vias and said ledge conductors, said vias extending to an underside of said artificial tip.

21. The artificial color changing nails of claim 20 comprising electrically conductive tabs adhered to said vias and exposed at an underside of said artificial tip.

22. The artificial color changing nails of claim 17 wherein electrically conductive crimps are fastened on said ledges each in electrical contact with one of said electrically conductive layers.

23. The artificial color changing nails of claim 22 wherein said electronic skin is injection molded with said polymer layer so as to be embedded therein, and electrically conductive metal tabs extend from each of said crimps and protrude from a bottom of said polymer layer.

24. The artificial color changing nails of claim 22 wherein said polymer layer is coated above said electronic skin, and electrically conductive metal tabs extend from each of said crimps and protrude from a bottom of said polymer layer.

25. A method of changing a color of artificial nails comprising
  providing an artificial nail comprising:
    a layer of polymer in a general size and shape of a human natural nail, said polymer including a body placed in a fixed position above the natural nail and a tip near a free end of the natural nail;
    a display stacked in a fixed position on the natural nail relative to said polymer layer comprising at least one electro-optic layer of bistable electro-optic material, and electrically conductive layers disposed on either side of said electro-optic layer; and
    a ledge extending from said display that is disposed at said tip, said electrically conductive layers being disposed on said ledge; and
  providing a device having electronic drive circuitry that can apply a variety of selected voltages capable of producing different colors when electrically addressing said electro-optic layer, a display indicator on said device showing a plurality of colors each corresponding to one of said voltages, said device including a seating surface conforming to a shape of a bottom of a tip of said artificial nail, spaced electrical conductors extending on said seating surface extending from said drive circuitry; and
  inserting said tip of the artificial nail onto said seating surface so that said electrical conductors of said display contact said electrical conductors of said seating surface;
  selecting a desired color by moving a color selecting indicator near a desired color on said color display indicator; and
  activating said drive circuitry to produce a voltage corresponding to said selected color, said voltage being applied along said electrical conductors of said seating surface, to said electrical conductors of said display, effective to enable said electro-optic layer to assume said selected color.

26. The method of claim 25 wherein said display comprises flexible electronic skin.

27. The method of claim 25 wherein said electro-optic material comprises bistable liquid crystal material.

28. The method of claim 27 wherein said liquid crystal comprises bistable cholesteric liquid crystal material.

29. The method of claim 28 wherein said bistable cholesteric liquid crystal comprises regions of said liquid crystal material dispered in a polymer matrix.

30. The method of claim 29 wherein the at least one said electro-optic layer comprises at least two layers of said bistable cholesteric liquid crystal material each having a pitch length effective to reflect light of different color than the other liquid crystal layer.

31. The method of claim 30 wherein said liquid crystal layers reflect red, green and blue light.

* * * * *